Patented May 25, 1937

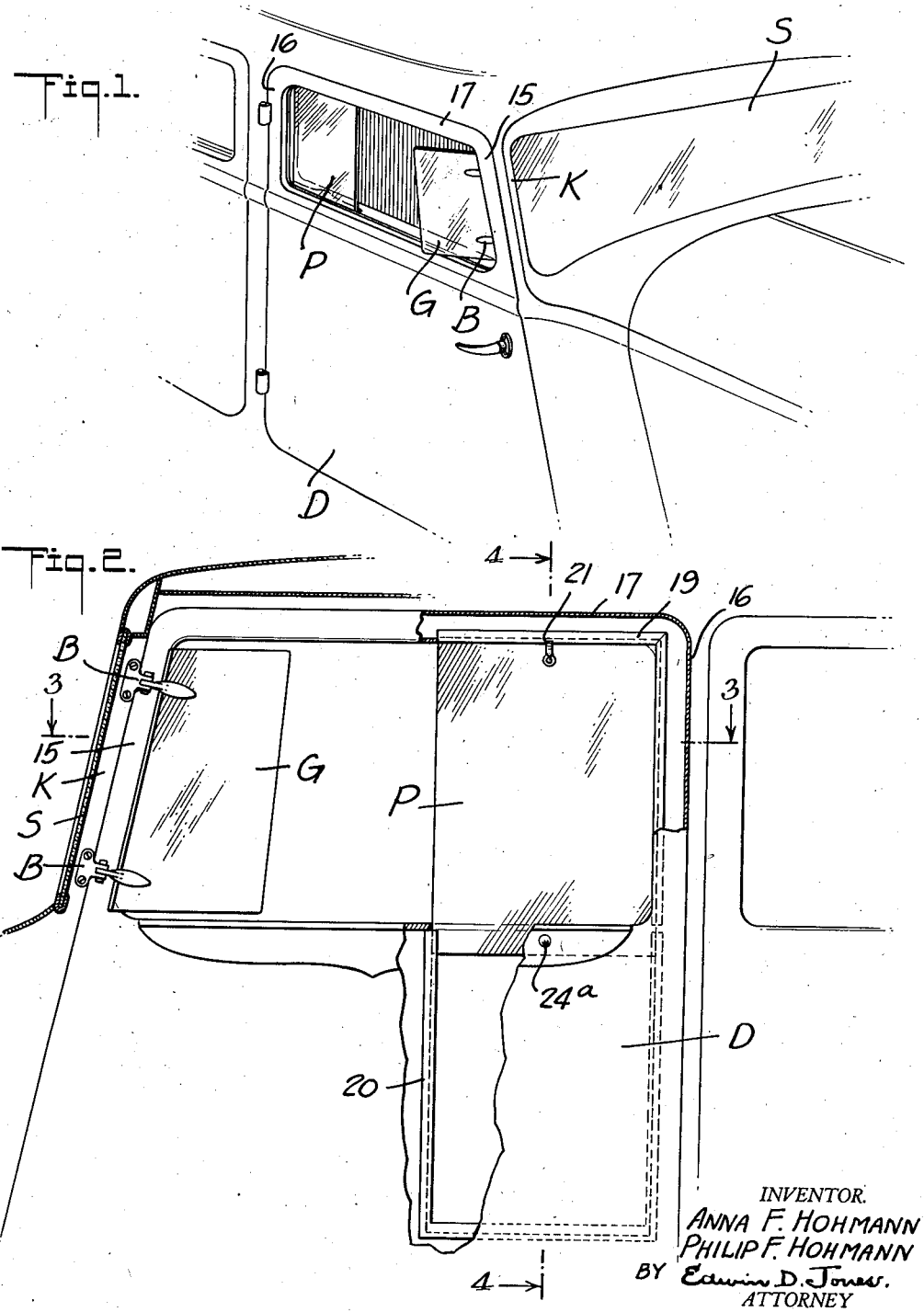

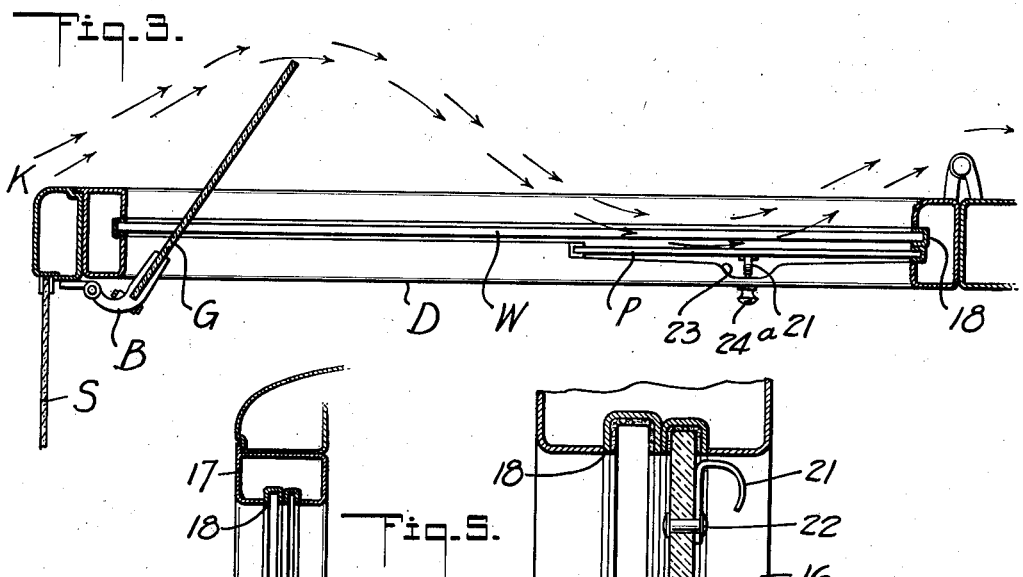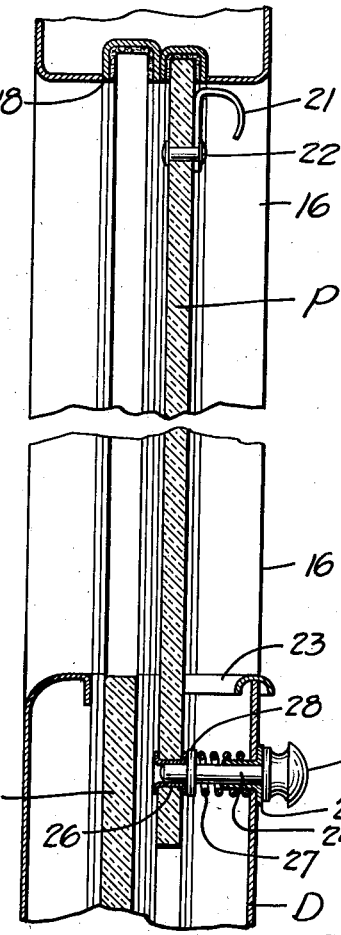

2,081,745

UNITED STATES PATENT OFFICE 2,081,745

VEHICLE WINDOW

Anna F. Hohmann and Philip F. Hohmann, Los Angeles, Calif.

Application January 2, 1934, Serial No. 704,914

1 Claim. (Cl. 296—44)

Our invention relates to windows for automobiles and similar vehicles, and it has particular reference to wind-shields of the character disclosed in the application of Philip F. Hohmann Serial Number 594,027, filed February 19, 1932. In the aforementioned application there is embodied a wind-shield which is in the nature of an attachment to the windowed body of an automobile, and when applied covers the rear portion of one window opening of the car to extend a distance sufficiently forward so that under the normal forward movement of the car it functions to prevent entry into the window opening of that portion of the exterior air stream which is normally directed or deflected inwardly through the window opening to the discomfort of the occupants of the automobile.

It is a purpose of our invention to provide a window which accomplishes the same results as the wind-shield of the aforementioned application, but instead of being in the nature of an attachment, is built into the door or body of the automobile in the manner of the conventional sliding window and to be operated in a similar manner to open or close the rear portion of the window opening and when closing the latter to prevent entry of the exterior air stream inwardly through the window opening.

We will describe only one form of vehicle window embodying our invention, and will then point out the novel features thereof in the claim.

In the accompanying drawings:

Fig. 1 is a view showing in fragmentary perspective a conventional form of automobile body of the windowed type having built in one door thereof one form of window embodying our invention.

Fig. 2 is an enlarged vertical longitudinal sectional view of the vehicle body shown in Fig. 1 with portions of the door broken away to reveal parts not otherwise disclosed.

Figs. 3 and 4 are enlarged sectional views taken on the lines 3—3 and 4—4, respectively, of Fig. 2, the window in both figures being in the lowered or inactive position.

Fig. 5 is a view similar to Fig. 4 showing the window in active or elevated position.

Referring specifically to the drawings the automobile body shown is of conventional form and provided with the usual front wind-shield S extending between the front corner posts K. To each corner post are secured brackets B carrying a glass plate G constituting a wind-wing when moved to the projected position shown in Figs. 1 and 3. Each side of the vehicle body is provided with the conventional hinged door D on which is secured a window frame comprising front and rear end portions 15 and 16 and a top portion 17 connecting the two.

The area defined by the window frame constitutes a window opening in which the main window closure or pane W is slidable vertically to partly or completely close the opening. Conventional channel strips 18 are provided both in the door and window frame for receiving the edges of the pane W for supporting and guiding it in its vertical movements.

Our invention enters with the provision of the window frame with an L shape channel frame 19, and the door D with a U-shaped channel frame 20. These frames are provided for the purpose of receiving, supporting and guiding an auxiliary window closure P in the form of a pane of glass or other material suitable for the purpose. The pane P is supported so that it is capable of vertical sliding movement from the lowered position shown in Fig. 4 to the elevated positions shown in Figs. 2 and 5.

The channel frames 19 and 20 are positioned in the door and window frame at one side of the channel strips 18 so that the auxiliary window closure P is mounted for vertical sliding movement at the inner side of the main auxiliary closure W. As the frames are situated to the rear of the door and window frame, the window closure P when in elevated position spans and closes the rear portion of the window frame. In this manner the auxiliary closure functions to shield the occupants of the vehicle against indrafts of air through the rear portion of the window opening, as will be more fully described hereinafter.

The closure P normally occupies the lowered position shown in Fig. 4. This position we term an inactive one because it does not span the rear portion of the window frame, and hence, it is ineffective to prevent entry of air drafts into the body. In the inactive position of the closure a hook-shaped handle 21 is accessible to the operator for sliding the closure to elevated or active position. This handle is fixed to the closure by a stud 22 extended through the glass. The shape of the handle is such that it is accommodated in a recess 23 in the upper edge of the door, as best shown in Fig. 3.

To secure the closure P in elevated position, any suitable latch may be provided which is accessible from the inner side of the door. In the present instance, this latch comprises a bolt 24 (Fig. 3) slidable in a sleeve 25 secured in the inner panel of the door. The outer end of the bolt is formed with a knob 24ᵃ which is adapted to be gripped by the operator for pulling the bolt outward so that its inner end is withdrawn from a tubular keeper 26 extending through and secured in the closure by flanging its opposite ends, as shown. Movement of the bolt free of the keeper is against the tension of a coiled spring 27 surrounding the bolt and interposed between the door panel and a collar 28 fixed on the bolt. Thus it will be understood that the bolt is normally held within the keeper by the spring to maintain the auxiliary closure in elevated or active position.

In describing the operation of our invention, reference will be had to Fig. 3 wherein the several arrows indicate the course of a deflected air stream under the forward movement of the vehicle. Irrespective of whether or not the wind-wing G is employed, this exterior air stream is so deflected under forward motion of the wind shield S that when the main window closure W and the auxiliary closure P are both down, the air stream passes through the window frame at the rear portion thereof to create discomfort and annoyance to the occupants of the car. However, by lifting the auxiliary closure to the active position shown in Fig. 3, the air stream will be deflected outward as indicated by the arrows, so that now there is no inflow of air through the window frame.

To accomplish the above described result the auxiliary closure P is of such width as to leave an opening which lies entirely forward of the foremost point at which the exterior air stream would pass through the window frame. In the event the wind-wing G is not used, it might be necessary to increase the width of the auxiliary closure in order to insure that the opening left in the window frame will be forward of the point at which the air stream would pass through the window frame. In either event the opening thus left provides sufficient space through which the driver may project his arm in signalling.

Although we have herein shown and described only one form of auxiliary window for vehicles embodying our invention, it is to be understood that various changes and modifications may be made herein without departing from the spirit of our invention and the spirit and scope of the appended claim.

What we claim is:

In combination; a vehicle body; a door in the side of the body; a window frame on the door; a main closure slidable in the door and window frame for opening and completely closing the window frame; a U-shaped channel frame in the door; an L-shaped channel frame in the window frame; an auxiliary closure slidable from one channel frame to the other to open or close the rear portion of the window frame and of a length to have a portion thereof remain within the first mentioned frame, when slid in the second mentioned frame; a handle on the upper end of the auxiliary closure; and means for latching the auxiliary closure in frame closing position comprising, a keeper in the lower end of the closure, and a spring pressed bolt movable in the door to engage the keeper and press against the closure when the latter is in open position.

PHILIP F. HOHMANN.
ANNA F. HOHMANN.